United States Patent [19]
Fujiki

[11] Patent Number: 5,589,853
[45] Date of Patent: Dec. 31, 1996

[54] ON-SCREEN DISPLAY APPARATUS WITH SEQUENTIALLY DISPLAYED PICTURE ADJUSTMENT MESSAGES

[75] Inventor: Mikio Fujiki, Tokyo, Japan

[73] Assignee: Sony Corporation, Tokyo, Japan

[21] Appl. No.: 290,225

[22] Filed: Aug. 15, 1994

Related U.S. Application Data

[63] Continuation of Ser. No. 1,278, Jan. 7, 1993, abandoned.

[30] Foreign Application Priority Data

Jan. 7, 1992 [JP] Japan ..................... 4-018539

[51] Int. Cl.$^6$ .................................. G09G 5/02
[52] U.S. Cl. .......................... 345/150; 345/156
[58] Field of Search .................. 340/701, 703, 340/792, 793, 706, 709, 711, 721, 825.72, 825.69; 358/10, 139, 194.1, 191.1; 345/186, 145, 146, 147, 150; 348/734, 687, 686, 678, 679

[56] References Cited

U.S. PATENT DOCUMENTS

| | | | |
|---|---|---|---|
| 3,854,123 | 12/1974 | Banach | 358/191.1 |
| 4,547,797 | 10/1985 | Mick | 348/687 |
| 4,694,286 | 9/1987 | Bergstedt | 340/724 |
| 4,731,654 | 3/1988 | Itabashi et al. | 358/194.1 |
| 4,896,291 | 1/1990 | Gest et al. | 340/703 |

FOREIGN PATENT DOCUMENTS

| | | |
|---|---|---|
| 2155714 | 9/1985 | European Pat. Off. . |
| 0372257 | 6/1990 | European Pat. Off. . |
| 0447167 | 9/1991 | European Pat. Off. . |
| 0448267 | 10/1991 | European Pat. Off. . |
| 0453335 | 10/1991 | European Pat. Off. . |
| 4041446 | 7/1991 | Germany . |
| 60-020689 | 6/1985 | Japan . |
| 61-241044 | 3/1987 | Japan . |

OTHER PUBLICATIONS

Tsuchida et al., Multi–picture System for High Resolution Wide Aspect Ratio Screen, *IEEE Transactions on Consumer Electronics*, vol. 37, No. 3, Aug. 1991, pp. 313–319, New York, U.S.

Tsuchida et al., Multi–picture System for High Resultion Wide Aspect ratio Screen, IEEE 1991 International Conference on Consumer Electronics, *Digest of Technical Papers*, Jun. 5, 1991, pp. 252–253, Rosemont, U.S.

*Primary Examiner*—Ulysses Weldon
*Assistant Examiner*—Chanh Nguyen
*Attorney, Agent, or Firm*—Jay H. Maioli

[57] ABSTRACT

An on-screen display apparatus for use in a process of picture quality adjustments displayed on a television monitor. The apparatus includes a memory for storing messages which signify the procedure of picture quality adjustments, and a controls circuit for controlling the operation in such a manner as to retrieve the messages from the memory sequentially in accordance with execution of the picture quality adjustments and to display the messages on the monitor. Since the messages are retrieved and displayed on the monitor successively, the picture qualities such as chrome, hue, brightness and contrast levels can be adjusted with facility through mere manipulation of keys by an operator.

4 Claims, 11 Drawing Sheets

```
☒CHROMA (COLOR)
      LEVEL  ADJ.
   CHROMA  PHASE (HUE)
      LEVEL  ADJ
   BRIGHT  LEVEL  ADJ.
   CONTRAST  LEVEL  ADJ.
   BIAS  ADJ.
   GAIN  ADJ.
   EXIT.
```

GRAY SCALE

WELCOME
TO THE
MONITOR WORLD

FIG. 5

▨CHROMA (COLOR)
　　　LEVEL ADJ.
　CHROMA PHASE (HUE)
　　　LEVEL ADJ
　BRIGHT LEVEL ADJ.
　CONTRAST LEVEL ADJ.
　BIAS ADJ.
　GAIN ADJ.
　EXIT.

```
         CHROMA (COLOR)
              LEVEL ADJ.
         CHROMA PHASE (HUE)
              LEVEL ADJ
20 ─── ▨BRIGHT LEVEL ADJ.
         CONTRAST LEVEL ADJ.
         BIAS ADJ.
         GAIN ADJ.
         EXIT.
```

FIG. 10

—BRIGHTNESS—
ONLY BAR INDICAED
BY ARROWS SHOULD BE
VISIBLE OF THE PLUGE
SIGNAL.
PRESS ENT.

ADJUSTMENT COMPLETED
SET THE MONITOR TO
NORMAL MODE.
PRESS ENT.

FIG. 14

CHROMA (COLOR)
    LEVEL ADJ.
CHROMA PHASE (HUE)
    LEVEL ADJ
BRIGHT LEVEL ADJ.
CONTRAST LEVEL ADJ.
BIAS ADJ.
GAIN ADJ.
20 — ▨EXIT.

FIG. 15

```
       CHROMA (COLOR)
           LEVEL ADJ.
       CHROMA PHASE (HUE)
           LEVEL ADJ
       BRIGHT LEVEL ADJ.
       CONTRAST LEVEL ADJ.
20 ─── ▨ BIAS ADJ.
       GAIN ADJ.
       EXIT.
```

FIG. 16

```
            ─ BIAS ─
ADJ BIAS TO OBTAIN
THE DESIRABLE GRAY
COLOR.
PRESS ENT.

```
CHROMA (COLOR)
       LEVEL ADJ.
CHROMA PHASE (HUE)
       LEVEL ADJ
BRIGHT LEVEL ADJ.
CONTRAST LEVEL ADJ.
BIAS ADJ.
▨GAIN ADJ.
EXIT.
```

20 → ▨GAIN ADJ.

FIG. 18

```
—GAIN—
ADJ GAIN TO OBTAIN
THE DESIRABLE WHITE
COLOR.
PRESS ENT.
```

ND ON-SCREEN DISPLAY APPARATUS WITH SEQUENTIALLY DISPLAYED PICTURE ADJUSTMENT MESSAGES

This is a continuation of application Ser. No. 08/001,278 filed Jan. 7, 1993, now abandoned.

BACKGROUND OF THE INVENTION

1. Field of the Invention

The present invention relates to an on-screen display apparatus adapted for use in adjusting the picture qualities of a television signal.

2. Description of the Conventional Technique

Any of the conventional television monitors is generally equipped with functions of adjusting the picture qualities inclusive of chrome, hue, brightness and contrast levels, so that a user can adjust such qualities manually. If a desired adjustment mode is selected by an operator in adjusting one of the picture qualities, a bar-graph indicator or the like is displayed on a television monitor (hereinafter referred to as a monitor). And when the operator depresses a key (e.g., "+" or "−") provided on a remote controller or the like, the appropriate picture quality is adjusted while the length of the indicator is changed in response to such depression.

However, the conventional display content represented visually on the monitor screen at the time of picture quality adjustment includes at most an indicator and the kind of quality to be adjusted, and it is impossible for the operator to know a proper manipulation for adjustment of the picture quality unless he has sufficient expert knowledge or reads the operation manual.

OBJECTS AND SUMMARY OF THE INVENTION

It is therefore an object of the present invention to provide an improved on-screen display apparatus which is capable of sequentially displaying on a monitor the procedure for picture quality adjustments to facilitate the manipulation performed by an operator for the adjustments.

According to one aspect of the present invention, there is provided an on-screen display apparatus for visually representing a picture quality adjustment process on a television monitor. The apparatus comprises a memory as a storage means for storing messages which signify the procedure for picture quality adjustments, and a CPU as a control means for sequentially retrieving the messages under control in accordance with execution of the adjusting manipulation and displaying the messages on the monitor. The apparatus further comprises a key input unit manipulated by an operator to transmit a desired command to the control means. Such key input unit has pattern selector keys, a message/enter key and arrow keys.

In the on-screen display apparatus of the constitution mentioned, messages signifying the operational procedure for adjusting the picture qualities such as chrome, hue, brightness and contrast levels are stored previously in the memory and, upon completion of one adjustment item by the operator, the CPU retrieves the messages sequentially and displays on the monitor screen the message for the next quality adjustment.

The above and other features and advantages of the present invention will become apparent from the following description which will be given with reference to the illustrative accompanying drawings.

DESCRIPTION OF THE PREFERRED EMBODIMENT

Figure 1:
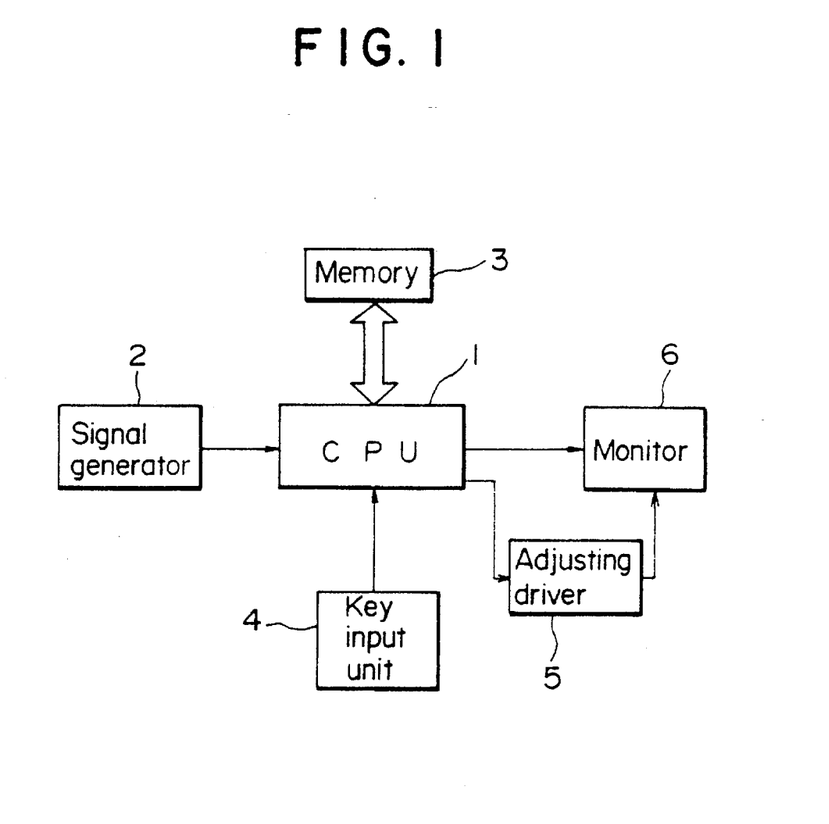
FIG. 1 is a block diagram of an embodiment representing the on-screen display apparatus of the present invention.

Hereinafter an exemplary embodiment of the present invention will be described in detail with reference to the accompanying drawings. FIG. 1 is a block diagram showing the constitution of an embodiment which represents the on-screen display apparatus of the present invention. The on-screen display apparatus comprises a CPU 1 serving as a control means; a signal generator 2 for generating a predetermined pattern such as color bars; a memory 3 as a storage means for storing various messages therein; a key input unit 4 such as a remote controller manipulated by an operator to transmit a desired command to the CPU 1; a picture quality adjusting driver 5 for controlling each of electronic variable resistors or the like in a television monitor so as to adjust the appropriate picture quality in response to the command transmitted by the operator; and a monitor 6 such as a CRT.

Figure 2A:
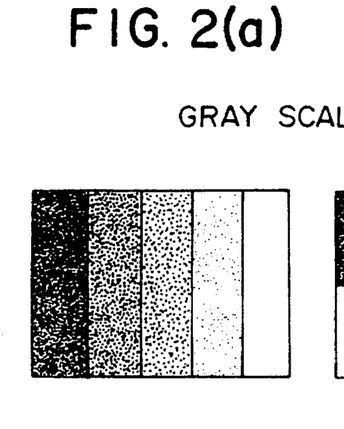
FIG. 2(a) through (c) show exemplary patterns displayed on a monitor.
Figure 2B:
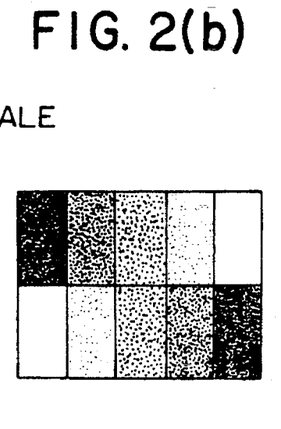
Figure 2C:
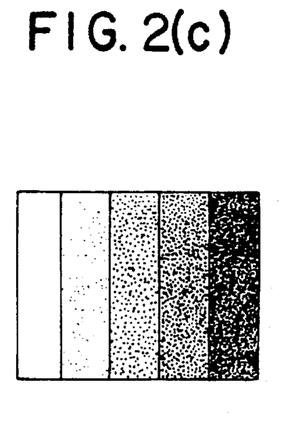

FIG. 2(a) through (c) show exemplary patterns obtained from the signal generator 2. Each of such patterns is termed a gray scale which consists of bands of sequentially different brightness values ranging from a black level to a white level. In the gray scale of FIG. 2, (a) is an example where a black level is at the left end of the screen, (c) is another example where a black level is at the right end thereof, and (b) is a further example where mutually inverse gray scales are arranged in upper and lower steps. The signal generator 2 is capable of generating at least one of such gray scales. However, there may be contrived a modification where any of the three kinds of gray scales can be selectively displayed. In this case, if the gray scales are sequentially changeable as (a)–(b)–(c)–(a) . . . through manipulation of the key input unit 4 by the operator, then it becomes possible to select the easiest-to-see gray scale for the operator.

The signal generator 2 is also capable of generating, in addition to the gray scale mentioned, an SMPTE color bar pattern which is composed of seven-color bars of red, green, blue, yellow, cyan, magenta and white. The signal generator 2 may be so formed as to further display, in compliance with individual requirements, a crosshatched pattern like a checkerboard on the entire screen, a window pattern merely in a portion of the screen, or a white pattern displayed at a white level.

Figure 3:
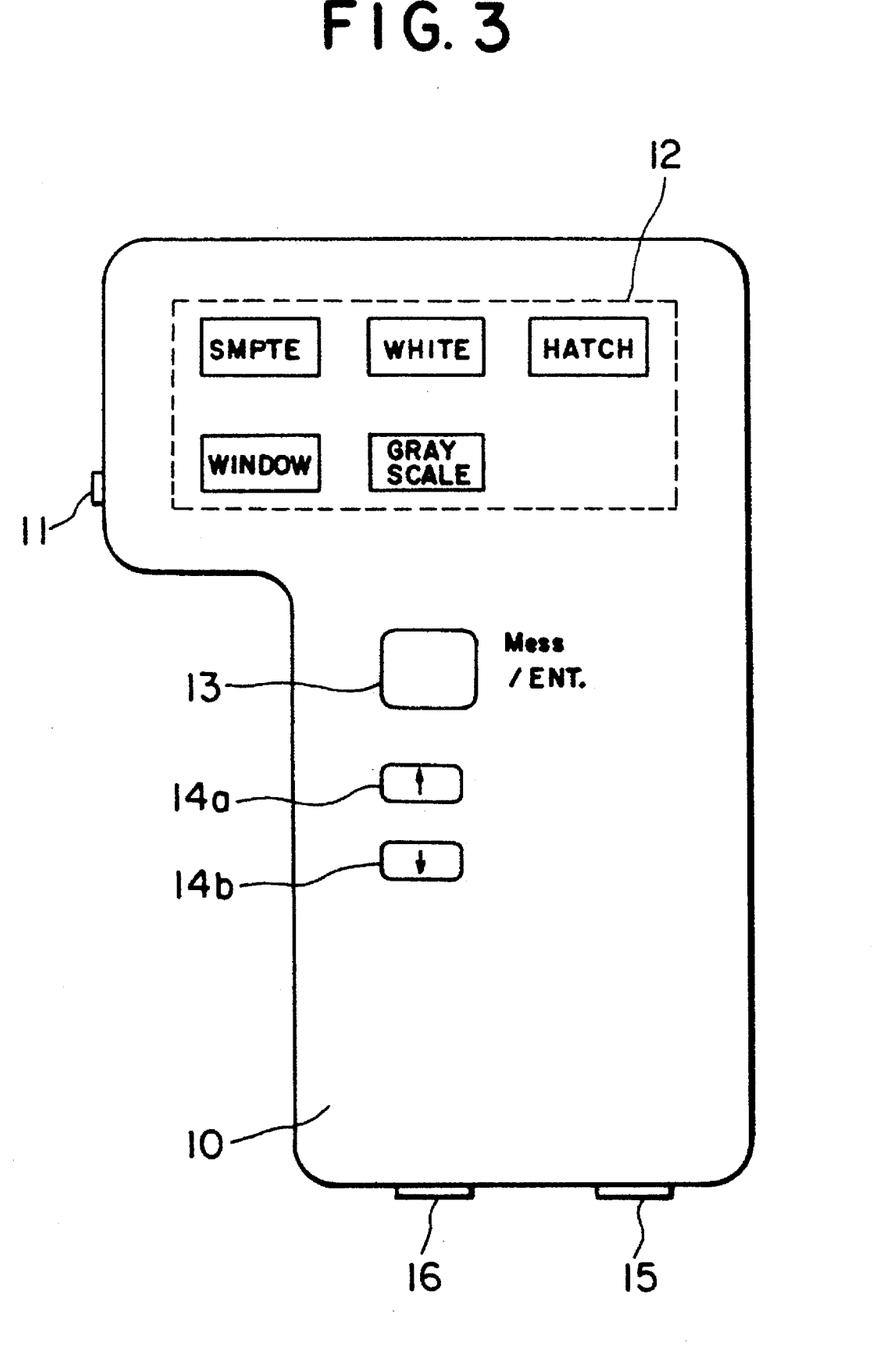
FIG. 3 is a plan view of a key input unit employed in the apparatus of FIG. 1.

FIG. 3 is a plan view showing an exemplary constitution of the key input unit 4. A power switch 11 is provided on one side of a body 10 to turn on or off the power supply for the key input unit 4. On the front face of the body 10, there are disposed selector keys 12 for selecting any of patterns generated from the signal generator 2, a message/enter key (hereinafter referred to as an enter key) 13 for shifting the process to a desired picture quality adjusting mode or for indicating display of undermentioned messages or confirmation of each adjustment operation; and arrow keys 14a and 14b used in the operation for each picture quality adjustment. On the lower side of the body 10, there are provided a cable connecting terminal 15 for connection to a television system including the CPU 1 and the monitor 6, and an external power connecting terminal 16 for connection of an external power supply.

Now the specific method and operation for picture quality adjustment will be described below in detail. First, when the enter key 13 in the key input unit 4 is depressed, the CPU 1 retrieves a message of FIG. 4 from the memory 3 and displays such message on the monitor 6. In the following description, it is assumed that the entire messages to be displayed on the monitor 6 are previously stored in the memory 3 and are displayed on the monitor 6 when retrieved therefrom by the CPU 1.

Figure 4:
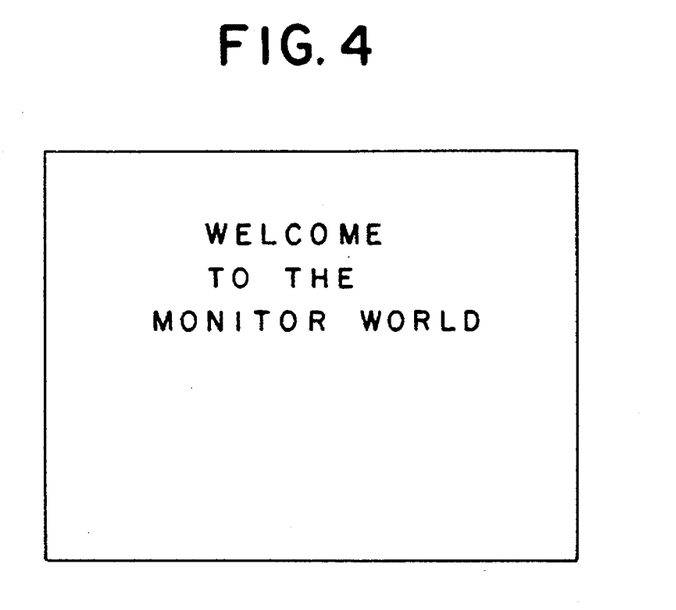
FIGS. 4 through 18 show exemplary messages displayed on the monitor.
Figure 5:
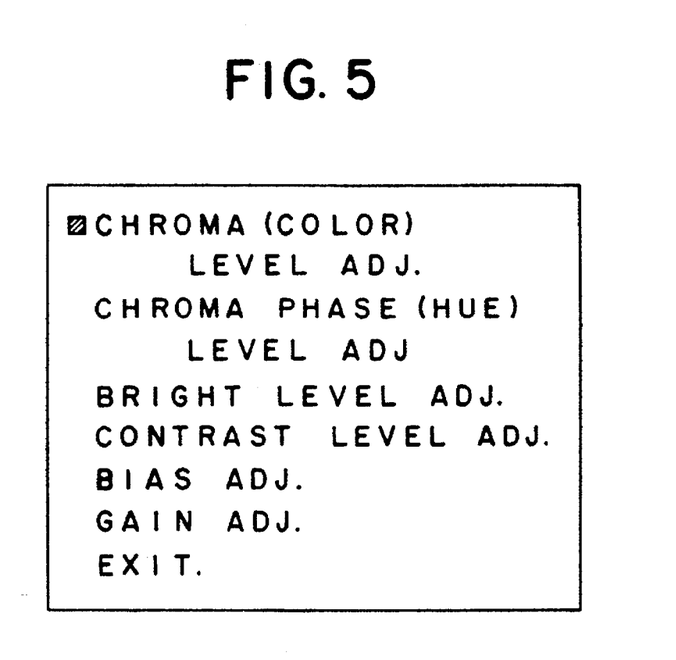

The message shown in FIG. 4 is automatically switched to a menu of FIG. 5 after a lapse of, e.g., 5 seconds. The menu of FIG. 5 has a function of informing the operator that six kinds of adjustments are possible relative to chrome, hue, brightness, contrast, bias and gain. In addition, a cursor 20 is displayed continuously or intermittently at the left of the screen to indicate which of the adjustment modes is executed.

Figure 6A:
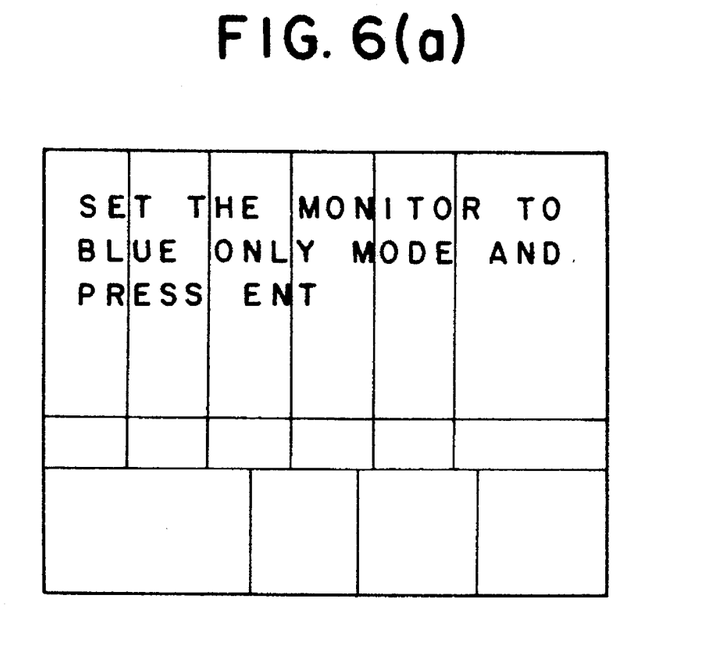

In this embodiment, the adjustments of four picture qualities such as chrome, hue, brightness and contrast levels are so executed that, upon completion of one quality adjustment, the cursor is shifted automatically to the next adjustment. And with regard to the bias and gain, the operator sets the cursor at a desired position for the relevant adjustment by manually depressing the arrow key In FIG. 5 where the cursor is set at the position of the chrome adjustment mode, if the operator depresses the enter key 13 in such a state, the display content on the monitor 6 is changed to the content shown in FIG. 6(a). In this example, the background is an SMPTE color bar pattern generated from the signal generator 2, and when the shown message is displayed on the monitor 6 by the CPU 1, the operator is informed of the item adjustable at that time.

Figure 6B:
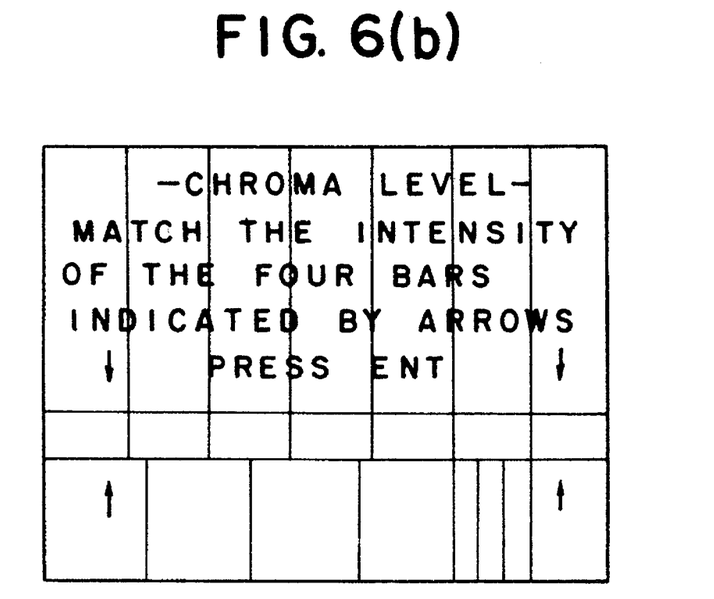
Figure 7:
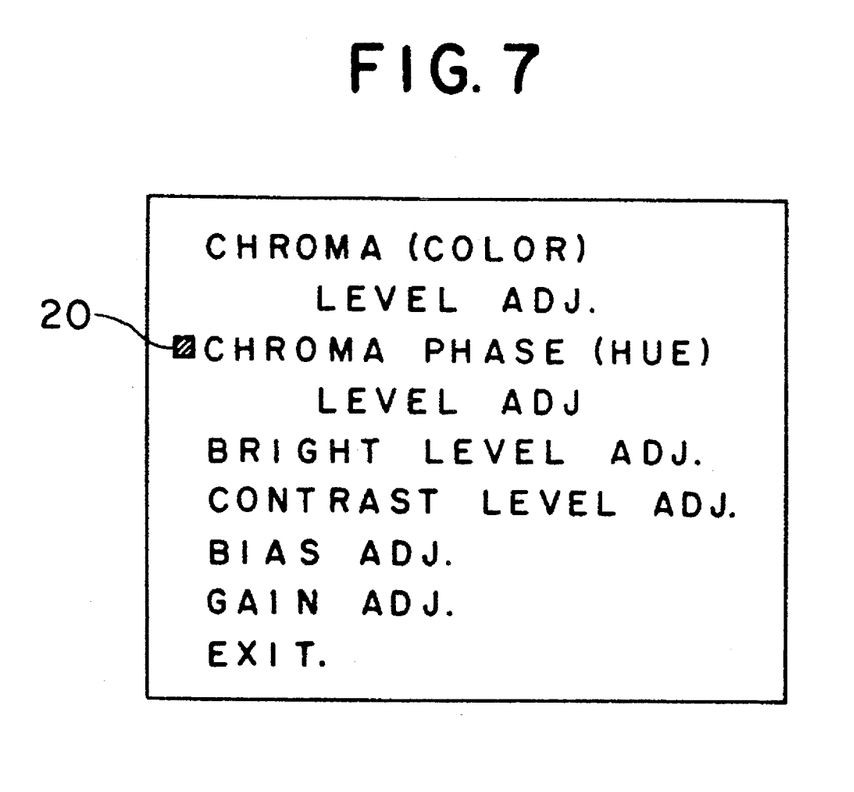

Upon depression of the enter key 1 by the operator according to the message, the display content on the monitor 6 is changed to the example shown in FIG. 6(b), so that the operator can adjust the desired picture quality (chrome level in this case) by depressing the arrow key 14a or 14b according to the message. And when the operator depresses the enter key 13 according to the message after completion of adjusting the chrome level, the display content on the monitor 6 is changed to the example shown in FIG. 7.

Figure 8A:
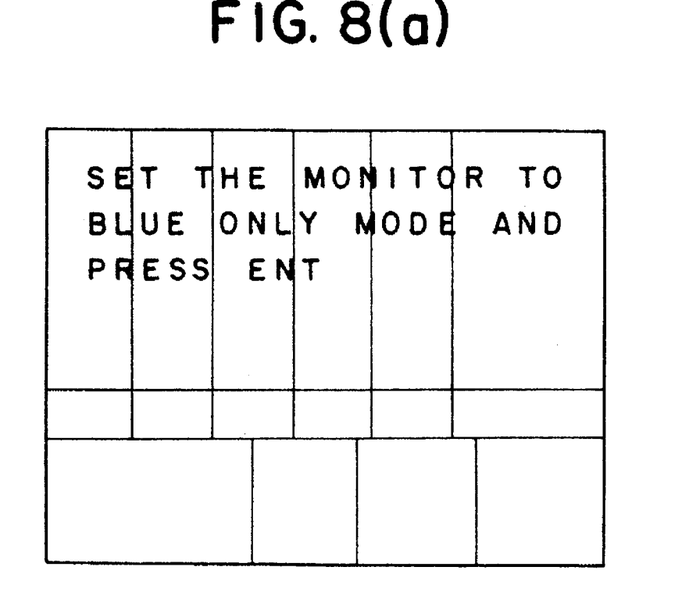
Figure 8B:
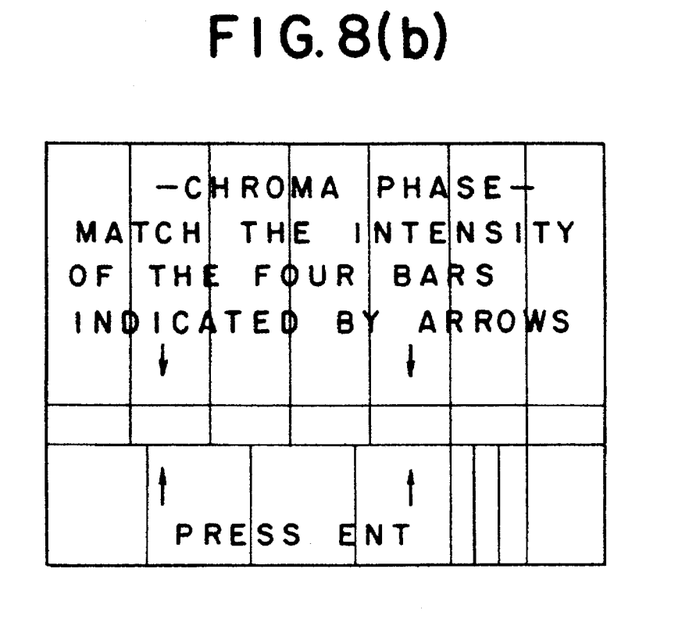
Figure 9:
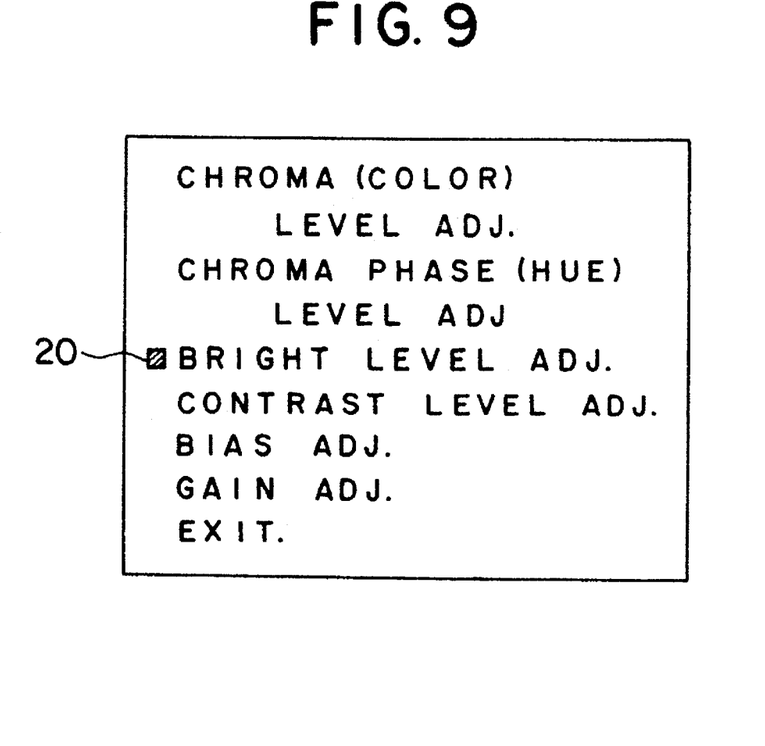
Figure 10:
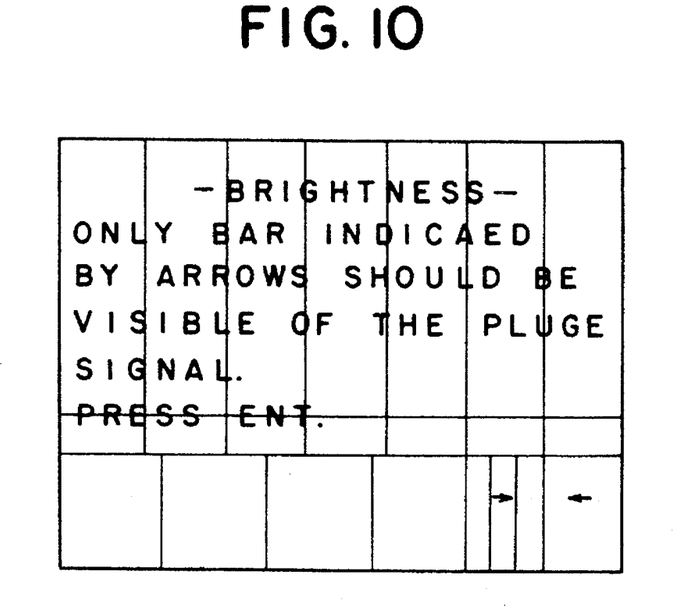
Figure 11:
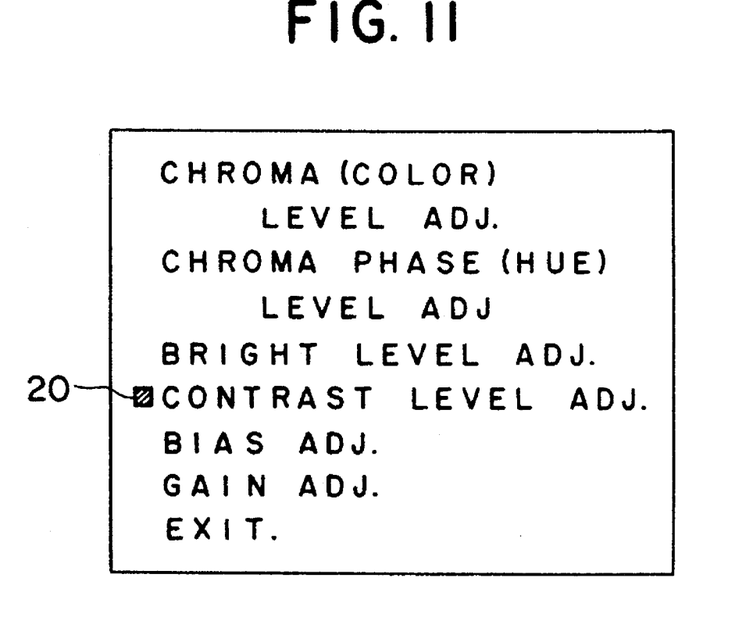
Figure 12:
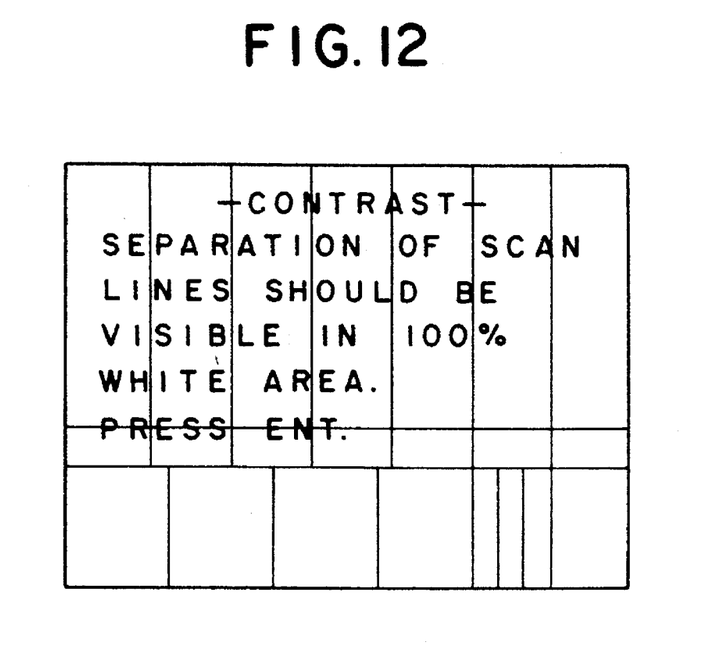
Figure 13:
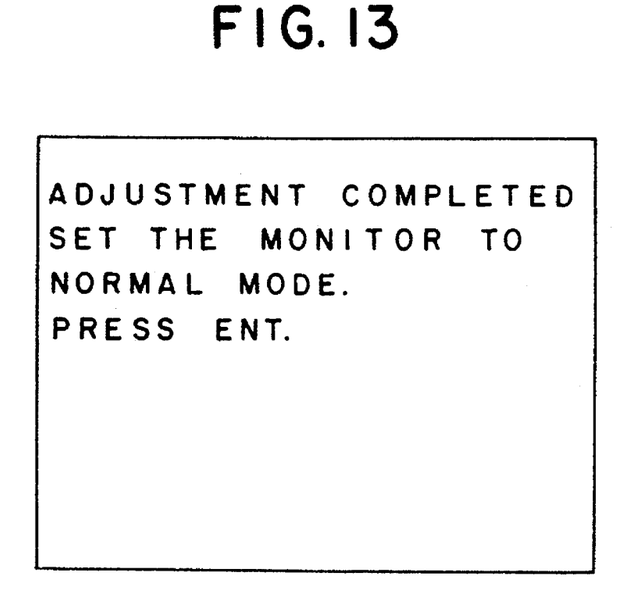

In this example, different from the aforementioned display content of FIG. 5, the cursor is set at the position for the hue adjustment. And if the operator depresses the enter key 13 according to the message exactly in the same manner as in the foregoing case of adjusting the chrome level, then the display content on the monitor 6 is reverted to the menu of FIG. 9 via the examples of FIG. 8(a) and (b).

FIGS. 10 through 13 show subsequent messages displayed while the memory 2 is accessed by the CPU 1 in the procedure of sequentially adjusting the brightness and contrast levels. Thus, the adjustments of chrome, hue, brightness and contrast levels can be executed with mere depression of the enter key 13 and the arrow keys 14a, 14b of the key input unit 4 by the operator according to the messages displayed on the screen.

Figure 14:
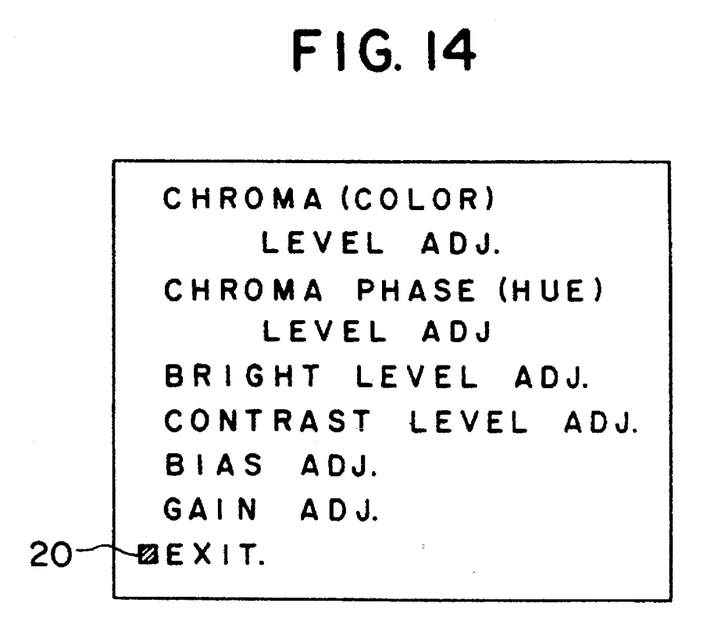

After completion of the series of adjustments, the display content on the monitor 6 is changed to the example of FIG. 14 where the cursor is placed at the position of EXIT to terminate the picture quality adjustment. Therefore, if the operator depresses the enter key 13 in this state, the apparatus is released from the picture quality adjustment mode to be ready for normal television watching.

Figure 15:
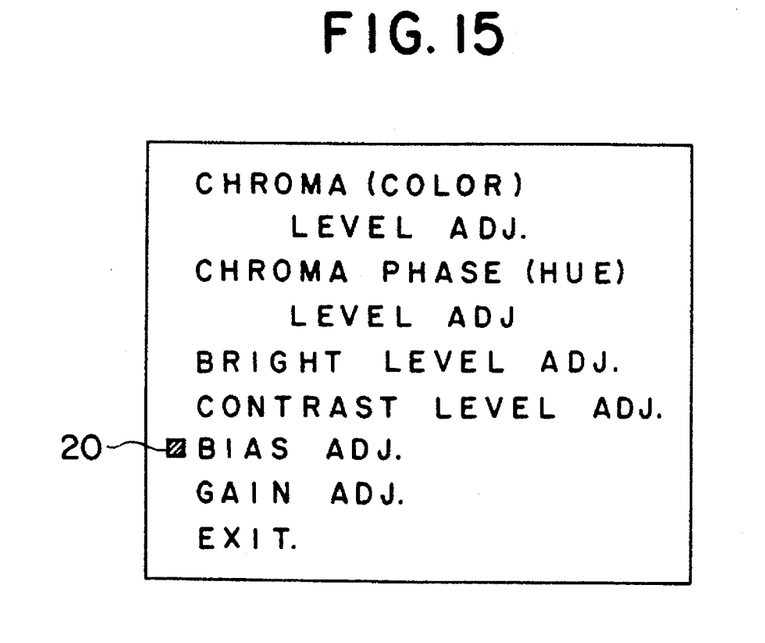

In case it is necessary to further adjust the bias and gain successively, the operator depresses the arrow key 14a or 14b of the key input unit 4 to shift the cursor to the position shown in FIG. 15. This procedure is based on the fact that it is not so frequent to perform the bias adjustment for determining the gray level or the gain adjustment for determining the gain at the white level. Therefore, although the procedure may be so established that the cursor is shifted automatically to the bias or gain adjustment in succession to the chrome, hue, brightness and contrast adjustments mentioned above, the operation in this embodiment is performed on the basis of the procedure that proceeds to the bias or gain adjustment mode with manual control of the cursor position.

Figure 16:
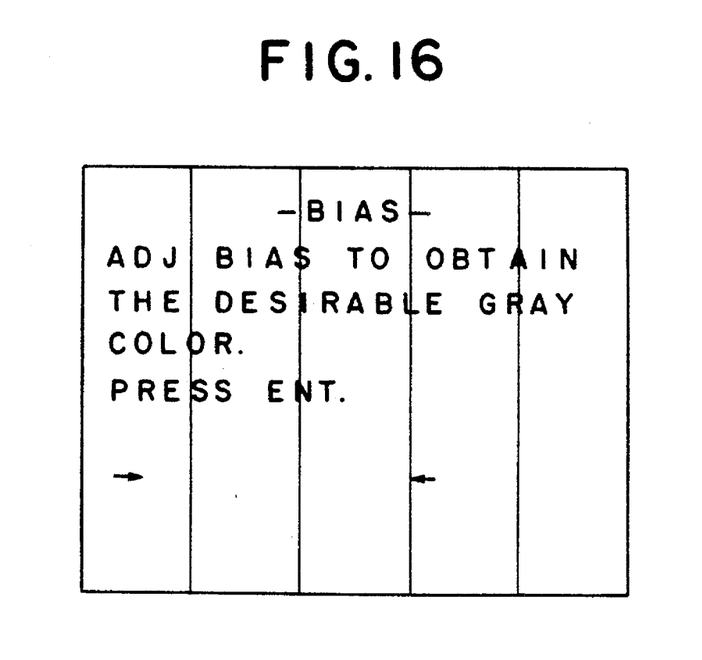

If the operator depresses the enter key 13 upon shift of the cursor to the position of the bias adjustment mode, the display content of FIG. 16 is visually represented on the monitor 6. The background in this case is switched to a gray scale.

And when the operator depresses the enter key 13 after completion of the picture quality adjustment according to the message, the display content is switched to the example of FIG. 15 again. It is to be noted here that the cursor position is not changed in this case.

Figure 17:
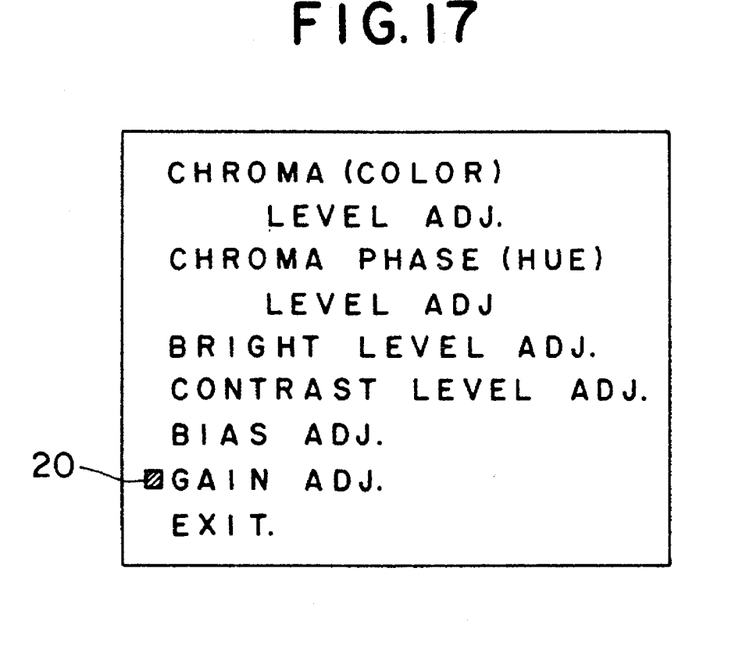
Figure 18:
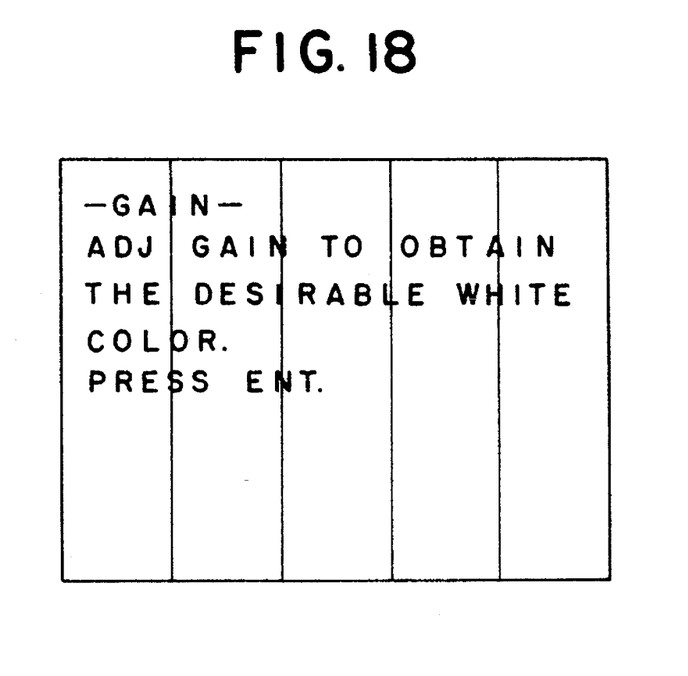

If it is necessary to execute the gain adjustment also, the operator shifts the cursor to the position of FIG. 17 and depresses the enter key 13. Then the display content on the monitor 6 is changed to the example of FIG. 18. And when the enter key 13 is depressed after the adjustment according to the message, the display content is reverted to the message of FIG. 17 again.

In the on-screen display apparatus of the present invention, as described hereinabove, messages signifying the procedure of picture quality adjustments are previously stored in the memory means, and the operation is so controlled by the control means that such messages are sequentially displayed on the monitor in conformity with the key manipulation by the operator. Therefore the requirement for the operator is merely to manipulate the keys according to the messages displayed on the monitor, hence eliminating the necessity of any expert knowledge or the operation manual to consequently facilitate the picture quality adjustments.

What is claimed is:

1. An on-screen display apparatus that guides an operator step-by-step through a process of picture quality adjustments of a television monitor, the apparatus comprising:

memory means for storing messages which instruct the operator as to each step of a step-by-step procedure to follow to accurately perform the picture quality adjustments of at least chroma, hue, brightness, contrast, bias, and gain;

a CPU for controlling the memory means in such a manner as to retrieve the messages from the memory means sequentially according to the step-by-step procedure for performing the picture quality adjustments and to display the retrieved messages on the television monitor;

a remote controller having a key input unit manipulated by the operator to transmit a desired command to the CPU, wherein the key input unit has pattern selector keys, a message/enter key, and arrow keys, and wherein the messages stored in the memory means are retrieved and displayed in response to manipulation of the key input unit by the operator; and a signal generator for generating a predetermined pattern in response to a pattern signal from the key input unit and for providing the predetermined pattern to the television monitor through the CPU, wherein the predetermined pattern generated by the signal generator includes a gray scale pattern having an array of gray scale levels ranging from white to black, the gray scale pattern being used in the picture quality adjustment of the bias, and the picture quality adjustment of the gain is used for setting a white level gain.

2. The apparatus according to claim 1, wherein the pattern selector keys are used for selecting any of a plurality of patterns generated by the signal generator and the message/enter key is used for shifting the process to a desired picture quality adjustment mode or for displaying the messages or confirmation of each adjustment operation.

3. The apparatus according to claim 1, wherein picture quality adjustment modes for chroma, hue, brightness and contrast levels are selectable by movement of a cursor by using the arrow keys as instructed by the messages.

4. The apparatus according to claim 3, wherein further picture quality adjustments of the bias and the gain are also selectable by depression of the arrow keys.

* * * * *